United States Patent [19]

Woodhead

[11] 4,231,893
[45] Nov. 4, 1980

[54] PROCESS FOR PREPARING AQUEOUS DISPERSION OF CERIA AND RESULTING PRODUCT

[75] Inventor: James L. Woodhead, Didcot, England

[73] Assignee: United Kingdom Atomic Energy Authority, London, England

[21] Appl. No.: 954,658

[22] Filed: Oct. 25, 1978

[30] Foreign Application Priority Data

Nov. 1, 1977 [GB] United Kingdom ............... 45471/77
May 25, 1978 [GB] United Kingdom ............... 22835/78

[51] Int. Cl.$^3$ ............................................. B01J 13/00
[52] U.S. Cl. ............................. 252/313 R; 106/14.21; 252/462; 423/263
[58] Field of Search ..................... 252/313 R; 423/263

[56] References Cited

U.S. PATENT DOCUMENTS

| | | | |
|---|---|---|---|
| 3,024,199 | 3/1962 | Pasfield | 252/313 R |
| 3,082,103 | 3/1963 | Wainer | 252/313 R X |
| 3,761,571 | 9/1973 | Woodhead | 423/263 |

OTHER PUBLICATIONS

Weiser: "The Hydrous Oxides", McGraw-Hill Book Co., Inc, First Ed., 1926, pp. 252–259.

Primary Examiner—Richard D. Lovering
Attorney, Agent, or Firm—Larson, Taylor and Hinds

[57] ABSTRACT

The invention is concerned with the preparation of dispersions and particularly with the preparation of dispersions of cerium compounds.

The invention provides for the preparation of an aqueous dispersion of ceria or hydrated ceria by a process which includes acid treatment of cerium IV hydroxide.

Aqueous dispersions in accordance with the present invention find application in a number of technical fields (e.g. in the preparation of dense ceria coatings for use in catalysis and protective coatings, for example, for metals and alloys).

12 Claims, No Drawings

PROCESS FOR PREPARING AQUEOUS DISPERSION OF CERIA AND RESULTING PRODUCT

TECHNICAL FIELD

The present invention relates to the preparation of dispersions and more particularly to the preparation of disperions of cerium compounds.

BACKGROUND ART

British Patent No. 1,342,893 (UKAEA) discloses and claims inter alia:

"A process for use in the manufacture of ceria from cerium IV hydroxide comprising forming the cerium IV hydroxide into a slurry with water and nitric acid; heating the slurry for such a time and at such a temperature that the pH reaches a steady value, the quantity of nitric acid in the slurry being such that the steady value of pH is below 5.4 thereby to produce a conditioned slurry and drying such conditioned slurry to give a dry gel powder."

DISCLOSURE OF INVENTION

It has now been found that acid treatment of cerium IV hydroxide can be used to give aqueous dispersions of ceria or hydrated ceria which find application in a number of technical fields (e.g. in the preparation of dense ceria coatings for use in catalysis and protective coatings, for example, for metals and alloys).

Thus, according to the present invention there is provided a process for the preparation of an aqueous dispersion of ceria which comprises a slurry of cerium IV hydroxide with water and an acid, the acid being capable of causing deaggregation of aggregated crystallites in the cerium IV hydroxide, heating the slurry for such a time that the pH reaches a steady value, the quantity of acid in the slurry being such that the said steady value of pH is below 5.4, thereby to produce a conditioned slurry and admixing water with the conditioned slurry to produce an aqueous dispersion of ceria.

It will be understood that the ceria in the aqueous dispersion will, in general, not be cerium oxide as such, but will be a hydrated form thereof.

Of the common inorganic acids it is believed that nitric acid is the most suitable for use in accordance with the present invention. Thus, as disclosed in British Patent No. 1,342,893, hydrochloric acid would react with the cerium IV species present to give chlorine. Other acids such as hydrofluoric acid react with cerium IV to give insoluble compounds and sulphuric acid in excess of that required to dissolve entrained rare earths other than ceria dissolves a large proportion of the ceria and gives no significant effect on the degree of aggregation of crystallites.

It is believed that some organic acids (e.g. trichloracetic) can be used in accordance with the present invention providing that they are capable of reaching the required pH value, are capable of causing deaggregation of crystalliites, and do not form complexes with cerium and other rare earth species in the slurry.

It is believed that it is the hydrogen (or hydroxonium) ions of the acid which is important in achieving deaggregation and therefore the choice of acid will generally be based upon selecting an acid whose associated anion (e.g. $NO_3^-$ in the case of $HNO_3$) does not cause adverse effects (e.g. pptn of insoluble compounds in the case of HF).

The degree of deaggregation of the cerium IV hydroxide and hence the degree of aggregation of crystallites in the aqueous dispersion of ceria depends upon the extent of treatment with the acid. Thus in general the lower the final steady value of the pH after treating with acid, the greater the deaggregation of crystallites. Thus, it will be appreciated that the particles in the aqueous dispersions, being aggregates of crystallites, will, in general, be smaller the lower the steady value of the pH of the conditioned slurry prior to admixing with water.

Thus, the present invention provides for a range of dispersions, ranging from at one extreme, dispersions having relatively large particles (produced from conditioned slurries of pH near to 5.4) through intermediate dispersions (which may be colloidal dispersions with some larger aggregates of crystallites) to, at the other extreme, stable colloidal dispersions (sols) (produced from conditioned slurries having low pH values as hereinafter disclosed).

The stable colloidal dispersions contain particles which are small in comparison with the particles of the starting cerium IV hydroxide. The particles in the stable dispersions are obtained by subjecting the cerium IV hydroxide to the appropriate degree of acid treatment in accordance with the invention to achieve the required degree of deaggregation.

The starting cerium IV hydroxide, typically can consist of insoluble particles of up to $\sim 2000$ A (not colloidal dimensions) in diameter. The acid treatment to give a conditioned slurry of low pH can achieve, for example, a 10 to 20-fold reduction in this size to give individual crystallites and small aggregates of crystallites of say $\sim 100$ A (colloidal dimensions).

To achieve the stable aqueous ceria dispersions we prefer that the amount of acid used is such that the steady value of pH in the conditioned slurry is $<2.8$. It has been found that colloidal dispersions produced from conditioned slurries of pH $<1.5$ are particularly stable and can be conveniently used, for example, in the formation of dense ceria (e.g. as coatings).

A conditioned slurry produced in accordance with the present invention can be termed a "dispersible conditioned slurry" in as much as it can be dispersed with water to form a dispersion.

The conditioned slurry as produced by heating to a steady pH value in accordance with the invention may be allowed to settle and any supernate removed prior to the admixing with water. It has been observed that ions in the supernate can assist in formation of the settled slurry by flocculation.

The cerium IV hydroxide may contain "acid consuming" impurities (e.g. other rare earth hydroxides) and the amount of acid required to achieve a given steady value of pH may vary according to the purity of the starting cerium IV hydroxide. This is discussed in British Pat. No. 1,342,893.

The time required for heating depends on the temperature of heating, and this is also discussed in British Pat. No. 1,342,893.

It has been found that certain cerium IV hydroxides are not easily susceptible to deaggregation in accordance with the present invention. However, it is simple to test this by trial.

It is believed that a starting cerium IV hydroxide which has a significant content (e.g. $\sim 10\%$) of cerium III species and/or which is composed of large (5 to 10 μm) glassy fragments is not particularly suited to treatment in accordance with the present invention. In some circumstances, therefore, it may be necessary to reduce the concentration of cerium III species and/or breakdown the large glassy fragments prior to treatment with acid in accordance with the present invention.

On the other hand, a starting cerium IV hydroxide of >99% purity having a "cauliflower-like" structure free of glassy fragments (as shown by Scanning Electron Microscopy) is readily deaggregated in accordance with the present invention (e.g. by $HNO_3$).

Furthermore, to facilitate deaggregation as hereinbefore disclosed it is believed that it is preferable that the starting cerium IV hydroxide should not have been heated to cause any substantial irreversible loss of water (e.g. heating to >100° C.) prior to treatment in accordance with the present invention. For example it has been found that a starting cerium IV hydroxide having 25% by weight water can be deaggregated in accordance with the present invention whereas some samples with 10% by weight water content were not easily amenable to deaggregation.

Also it is believed that the time and temperature and humidity of any prior heat treatment of the starting cerium IV hydroxide may affect the susceptibility of the cerium IV hydroxide to deaggregation in accordance with the present invention.

Anions associated with $H^+$ or $H_3O^+$ of the acid can be deleterious to the stability of dispersions in accordance with the invention and thus it is preferred to use the least acid consistent with achieving the desired deaggregation.

An example of production of a colloidal dispersion in accordance with the present invention is disclosed in copending British application No. 45471/77 (UKAEA) which discloses inter alia that the conditioned slurry specifically mentioned in Example 3 at page 4 line 50 of British Pat. No. 1,342,893 may be diluted with water to give a sol.

Cerium IV hydroxide for treatment in accordance with the present invention can be obtained commercially or, alternatively, can be obtained by any suitable route. For example it can be prepared from readily available cerium salts, (e.g. of "reagent grade"). The preparation may be by precipitation from a cerium salt.

Thus, for example, high purity cerous carbonate can be dissolved in aqueous nitric or hydrochloric acid to give a neutral solution and then oxidised with $NH_4OH/H_2O_2$ to give cerium IV hydroxide.

By way of further example cerium IV hydroxide for treatment in accordance with the present invention may be prepared by the conventional routes disclosed at page 1 lines 40 to 61 of British Pat. No. 1,342,893.

Example 3 of British Pat. No. 1,342,893 reads as follows:

"A paste of washed cerium hydroxide was diluted with water to give 249 l of a thin slurry (pH 8.2) and containing 25.8 kg of oxide (including 2.60 kg of rare earth oxides other than ceria). This slurry was mixed with 9.0 l of 16 M nitric acid to give a nitrate/ceria mole ratio of 0.98:1.0 and initial pH of 0.5 and the whole mass stirred and held at 100° C. for 1 hour. The slurry was allowed to cool and settle for 24 hours. A pale yellow supernate (150 l) was then removed; this supernate had a pH of 0.9 and contained 2.16 kg of rare earth oxides including 0.51 kg of ceria. The conditioned slurry (45 l) which was creamy and free from lumps had a density of 1.48 g/cc and contained 526 g/l of oxide. After spray drying at 103° C. exit temperature to particular matter in a size range of 5-25 μm, this gel had a tap density of 2.0 and contained 83.9% oxide. When calcined in air at 750° C. it yielded an oxide with a tap density of 3.1 g/cc.

The excellent flow properties of this oxide powder were used to facilitate the flame spraying (using a plasma gun) of stainless steel plates with a coating of ceria. The high density of the product enabled artefacts of high "green", i.e. unfired, density to be formed."

Washing of the precipitated cerium IV hydroxide can be effected as disclosed in British Pat. No. 1,342,893.

If the starting cerium IV hydroxide contains an unacceptable level of sorbed ions (e.g. $NO_3^-$) which could be deleterious to formation of the aqueous dispersion it can be deionised by use of up to 1 M hydroxide (e.g. NaOH or $NH_4OH$) solutions followed by washing to remove alkali cation contamination.

According to another aspect the present invention provides an aqueous dispersion of ceria prepared by a process in accordance with the invention.

The U.S. Pat. corresponding to British Pat. No. 1,342,893 is U.S. Pat. No. 3,761,571 which discloses and claims inter alia:

"A process for use in the manufacture of ceria from cerium IV hydroxide comprising heating a slurry of cerium IV hydroxide and water in the presence of nitric acid until the pH reaches a steady value below 5.4, thereby to produce a conditioned slurry, and drying said conditioned slurry to give a dry gel powder".

BEST MODE OF CARRYING OUT THE INVENTION

A number of ways of carrying out the invention are described in detail in the examples below.

EXAMPLE 1

Preparation of cerium IV hydroxide from cerium carbonate

Cerium carbonate (50 g; 99.9% purity) containing 69.3 w/o $CeO_2$ was slurried wiht 0.1 liter of distilled water and dissolved by adding $HNO_3$ (38.4 ml; 16 M). The resulting neutral solution was boiled for a few minutes, filtered to remove traces of insoluble matter, and diluted to 1 liter with water to give a cerous nitrate solution.

A mixture comprising $NH_4OH$ (40 ml; 18 M), $H_2O_2$ (20 ml; "100 volume") and water (160 ml) was added with stirring to the cerous nitrate solution prepared and maintained at 75° C.

The resulting insoluble, dark brown cerium IV peroxide complex rapidly faded in colour and after the complete addition of the $H_2O_2/NH_4OH$ mixture there was obtained a creamy-white precipitate of cerium IV hydroxide and a clear supernate of pH 7.0.

The precipitate was centrifuged and washed twice by stirring with successive 1 liter volumes of distilled water.

The final wash showed evidence of peptization and only traces of $Cl^-$ ions could be detected in the supernate.

EXAMPLE 2

Preparation of an aqueous dispersion of ceria

The separated precipitate of Example 1 was stirred with distilled water (750 ml) and nitric acid (12.5 ml of 16 M) to give a $HNO_3/CeO_2$ mole ratio of 1.0.

The resulting slurry was boiled for 15 minutes to deaggregate the cerium IV hydroxide and give a conditioned slurry.

The pH of the conditoned slurry was <1.

After cooling the slurry was centrifuged and the residue admixed with distilled water (150 ml) to give a semi-transparent greenish colloidal dispersion (sol).

EXAMPLE 3

Preparation of an aqueous dispersion of ceria

In this Example a cerium IV hydroxide (ex Rhone-Poulenc) of 98% purity was used. The major impurities were $La_2O_3$, $Pr_2O_3$ and $Nd_2O_3$.

A sample of this cerium IV hydroxide (100 g) was formed into a slurry with distilled water (150 ml) to give a slurry 2.46 M in oxide. The slurry was heated at 80° C. for 1 hour with nitric acid ($HNO_3/CeO_2$ mole ratio of 0.27) to give a conditioned slurry the steady pH value of which was <1. The settled conditioned slurry dispersed readily on admixture with water to give a stable sol ($NO_3/CeO_2=0.29$) containing 450 g/l oxide.

EXAMPLE 4

Preparation of an aqueous dispersion of ceria

A conditioned slurry was prepared as in Example 3 of British Pat. No. 1,342,893. A sample of the slurry, which was creamy and free from lumps, was not spray dried as in British Pat. No. 1,342,893, but was admixed with water to form a stable colloidal dispersion.

EXAMPLE 5

Preparation of an aqueous dispersion of ceria 3.5 kg of cerium IV hydroxide (99.5% purity) ex Rhone-Poulenc (2.48 kg oxide, 0.210 kg $NO_3^-$) were mixed with 7 l of demineralised water and 0.58 l of 8 M nitric acid (total slurry volume 9.6 l) and the stirred slurry heated to 80° C. over a period of 2 h and maintained at 80°–85° for 1 h. The pH reached at equilibrium was <1. The slurry ($HNO_3/CeO_2$:0.32) was allowed to cool overnight (16 h). The supernate was syphoned off (6.76 l) and analysed for acidity (0.28 M), nitrate (0.5 M) and oxide content (8.0 g/l). A sufficient volume of water (2.5 l) was added to the settled conditioned slurry residue in order to give a non-chalking colloidal dispersion (sol) and the new total volume measured (5.35 l). The sol was then analysed for density (1.42 g/cc), oxide content (462 g/l) nitrate (0.8 M:$NO_3/CeO_2=0.29$).

EXAMPLE 6

The procedure of Example 5 was repeated a number of times with varying $HNO_3:CeO_2$ ratios. The results are presented in Table I and Table II.

All Examples gave stable aqueous dispersions.

TABLE I

| Example No. | 6 | 7 | 8 |
| --- | --- | --- | --- |
| Oxide in slurry | 0.89 M | 1.5 M | 1.68 M |
| Nitric acid in slurry | 0.86 M | 0.49 M | 0.39 M |
| $HNO_3:CeO_2$ mole ratio in slurry | 0.97 | 0.33 | 0.23 |
| $H^+$ in supernate | — | 0.28 M | 0.14 M |
| pH conditioned slurry | — | 0.56 | 0.86 |
| Sol concentration (Maximum attainable) | 321 g/l | 462 g/l | 550 g/l |
| $NO_3/CeO_2$ in sol | 0.27 | 0.29 | 0.24 |

TABLE II

| Example No. | 9 | 10 | 11 |
| --- | --- | --- | --- |
| Oxide in slurry | 2.40 M | 8.1 M | 2.39 |
| Nitric acid in slurry | 0.41 M | 0.44 M | 0.40 |
| $HNO_3:CeO_2$ mole ratio in slurry | 0.17 | 0.14 | 0.17 |
| $H^+$ in supernate | 0.06 M | 0.006 M | 0.04 M |
| pH conditioned slurry | 1.4 | 2.2 | 1.4 |
| Sol concentration (Maximum attainable) | 578 g/l | 430 g/l | 580 g/l |
| $NO_3/CeO_2$ in sol | 0.27 | 0.27 | — |

I claim:

1. A process for the preparation of an aqueous dispersion of ceria comprising forming a slurry of cerium IV hydroxide with water and an acid, the acid being capable of causing deaggregation of aggregated crystallites in the cerium IV hydroxide, heating the slurry for such a time and at such a temperature that the pH reaches a steady value, the quantity of acid in the slurry being such that the said steady value of pH is below 5.4, thereby to produce a conditioned slurry, separating liquid containing unreacted acid from said conditioned slurry to provide a slurry residue and admixing sufficient water with the resulting slurry residue to produce a sol of ceria.

2. A process as claimed in claim 1 wherein the acid is nitric acid.

3. A process as claimed in claim 1 wherein the acid is an organic acid.

4. A process as claimed in claim 1 wherein the quantity of acid is such that the steady value of pH reached after heating is less than 2.8.

5. A process as claimed in claim 4 wherein the steady value of pH is less than 1.5.

6. A process as claimed in claim 1 wherein the cerium IV hydroxide is prepared for use in the process by pecipitation from a cerium salt.

7. A process as claimed in claim 6 wherein the cerium IV hydroxide is prepared by dissolving a cerous salt in an acid to give a solution and oxidising to give cerium IV hydroxide.

8. A process as claimed in claim 7, wherein the oxidising is effected with hydrogen peroxide.

9. A process as claimed in claim 8 wherein the hydrogen peroxide is mixed with ammonium hydroxide.

10. A process as claimed in claim 1 wherein prior to forming the slurry the cerium IV hydroxide is deionised by use of a hydroxide solution.

11. A process as claimed in claim 10 wherein the cerium IV hydroxide is washed to remove alkali cation concentration after deionising.

12. An aqueous dispersion of ceria whenever prepared by a process as claimed in claim 1.

* * * * *